(12) United States Patent
Bruno et al.

(10) Patent No.: US 12,037,014 B2
(45) Date of Patent: Jul. 16, 2024

(54) METHOD FOR DETERMINING AN AVOIDANCE PATH OF A MOTOR VEHICLE

(71) Applicant: Nissan Motor Co., Ltd., Yokohama (JP)

(72) Inventors: Geoffrey Bruno, Issy les Moulineaux (FR); Yann Blanco, Paris (FR); Anh Lam Do, Antony (FR); Alain Haddad, Montigny le bretonneux (FR)

(73) Assignee: Nissan Motor Co., Ltd., Yokohama (JP)

( * ) Notice: Subject to any disclaimer, the term of this patent is extended or adjusted under 35 U.S.C. 154(b) by 278 days.

(21) Appl. No.: 17/621,307

(22) PCT Filed: Jun. 4, 2020

(86) PCT No.: PCT/EP2020/065449
§ 371 (c)(1),
(2) Date: Dec. 21, 2021

(87) PCT Pub. No.: WO2021/001112
PCT Pub. Date: Jan. 7, 2021

(65) Prior Publication Data
US 2022/0355820 A1    Nov. 10, 2022

(30) Foreign Application Priority Data

Jul. 2, 2019    (FR) ...................................... 1907351

(51) Int. Cl.
*B60W 60/00*    (2020.01)
*B60W 30/09*    (2012.01)
(Continued)

(52) U.S. Cl.
CPC ........ *B60W 60/0011* (2020.02); *B60W 30/09* (2013.01); *B60W 30/0956* (2013.01);
(Continued)

(58) Field of Classification Search
CPC .......... B60W 60/0011; B60W 60/015; B60W 60/00274; B60W 30/09; B60W 30/0956;
(Continued)

(56) References Cited

U.S. PATENT DOCUMENTS 9,227,632 B1    1/2016 Lee
2012/0330541 A1*    12/2012 Sakugawa ........... B60W 30/095
                                                                701/301
(Continued)

FOREIGN PATENT DOCUMENTS

DE    102012017628 A1 *    3/2014    .......... B60W 10/182
DE    102012017628 A1        3/2014
(Continued)

OTHER PUBLICATIONS

English Translation for DE-102012017628-A1 (Year: 2023).*

*Primary Examiner* — Mahmoud S Ismail
(74) *Attorney, Agent, or Firm* — Young Basile Hanlon & MacFarlane, P.C.

(57) ABSTRACT

A method for determining an avoidance path of a motor vehicle includes the steps of:—acquiring data relating to an obstacle located in the surroundings of the motor vehicle by means of a detection system,—determining a final position to be reached according to the position of the obstacle and an initial position of the motor vehicle,—calculating a theoretical impact position located between the initial position and the final position, and—developing the avoidance path such that the motor vehicle passes through the initial position and the final position and avoids the theoretical impact position around the outside.

12 Claims, 3 Drawing Sheets

(51) Int. Cl.
*B60W 30/095* (2012.01)
*B60W 40/04* (2006.01)
*B60W 50/00* (2006.01)

(52) U.S. Cl.
CPC ........ *B60W 40/04* (2013.01); *B60W 50/0097* (2013.01); *B60W 60/0015* (2020.02); *B60W 60/00274* (2020.02); *B60W 2554/4041* (2020.02); *B60W 2554/801* (2020.02); *B60W 2554/802* (2020.02)

(58) Field of Classification Search
CPC ............. B60W 40/04; B60W 50/0097; B60W 2554/4041; B60W 2554/802; B60W 2554/801
USPC .......................................................... 701/301
See application file for complete search history.

(56) References Cited

U.S. PATENT DOCUMENTS

| | | |
|---|---|---|
| 2016/0144838 A1 | 5/2016 | Spencer et al. |
| 2016/0280265 A1 | 9/2016 | Hass et al. |
| 2018/0099667 A1* | 4/2018 | Abe ........................ G08G 1/167 |
| 2018/0174463 A1* | 6/2018 | Ohta ...................... B60W 30/08 |
| 2019/0086925 A1* | 3/2019 | Fan ..................... G01C 21/3837 |
| 2020/0098265 A1* | 3/2020 | Agnew ................. B60W 50/14 |
| 2020/0101800 A1* | 4/2020 | Kim ..................... B60C 29/062 |
| 2020/0282979 A1* | 9/2020 | Kim ..................... B60W 40/09 |

FOREIGN PATENT DOCUMENTS

| | | |
|---|---|---|
| DE | 102013009252 A1 | 12/2014 |
| DE | 102013010004 A1 | 12/2014 |
| DE | 102014206341 A1 | 10/2015 |

\* cited by examiner

METHOD FOR DETERMINING AN AVOIDANCE PATH OF A MOTOR VEHICLE

CROSS-REFERENCE TO RELATED APPLICATION(S)

This application claims priority to and the benefit of French Patent Application Ser. No. 1907351, filed Jul. 2, 2019, the entire disclosure of which is hereby incorporated by reference.

TECHNICAL FIELD

The present invention generally relates to motor-vehicle driver-assistance systems and to autonomous vehicles.

It more particularly relates to a method for determining an avoidance path of a motor vehicle after an obstacle has been detected on the path of this vehicle.

It also relates to a device allowing such a method to be implemented.

BACKGROUND

With regard to increasing the safety of motor vehicles, the latter are currently fitted with driver-assistance systems or autonomous driving systems.

Among these systems, AES systems (AES standing for "automatic evasive steering" or "automatic emergency steering"), which allow an obstacle to be avoided by deviating the vehicle from its path, either via action on the steering of the vehicle or via action on the differential braking system of the vehicle, are especially known.

Document DE102013009252 describes a system allowing an avoidance path to be computed and a control member of the vehicle to be controlled so that the vehicle follows this avoidance path.

In this document, the avoidance path is computed on the basis of an initial position, of a desired final position of the vehicle and of a polynomial model of the path.

The applicant has however observed that the avoidance path thus computed may not be comfortable or reassuring enough.

SUMMARY

In order to remedy all or some of the aforementioned drawbacks of the prior art, the present invention provides a new way of computing the avoidance path.

More particularly, according to the invention, a method is provided for determining an avoidance path of a motor vehicle, comprising steps of:
  acquiring data relating to at least one obstacle located in the environment of the motor vehicle by means of a detecting system, said data comprising a theoretical-impact-position distance between the vehicle and the obstacle,
  determining a final position to be reached by the motor vehicle depending on the position of the obstacle and on an initial position of the motor vehicle,
  computing a theoretical impact position located between the initial position and the final position, depending on at least a minimum distance to be kept between the avoidance path and the obstacle, and
  generating the avoidance path so that the motor vehicle passes through the initial position and through the final position and so that the motor vehicle avoids the theoretical impact position to the outside with respect to the obstacle.

Thus, by virtue of the invention, provision is made to detect the dynamic position of a theoretical point referred to as the point of impact, which is the limit position through which it is forbidden to pass in order to avoid hitting the obstacle, or a plurality of obstacles, while respecting a minimum safety distance between the vehicle and each of the obstacles. In addition, the invention allows the computation of a provisional avoidance path to be avoided.

Preferably, said at least one minimum safety distance is oriented with respect to the motor vehicle, so as to have at least a longitudinal component with respect to the longitudinal axis of the motor vehicle, and preferably also a lateral component.

Thus, by virtue of the invention, said minimum safety distance is computed depending on the movement of the target, using the longitudinal and lateral speeds, this allowing this safety distance to be made more robust, with a view to obstacle avoidance in spite of possible errors in the sensors of safety radius.

The following are other advantageous and non-limiting features of the method according to the invention, these features possibly being implemented individually or in any technically possible combination:
  in order to determine the impact position, provision is made to determine the position of a first point of the obstacle closest to a predicted avoidance path on the basis of the data acquired by the detecting system, and to deduce the theoretical impact position depending on the position of said first point and on at least one other datum;
  said other datum belongs to the following list:
  a predetermined uncertainty of the detecting system, the nature of the obstacle, and the relative speed of the obstacle with respect to the motor vehicle;
  provision is made to determine a safety zone around said at least one obstacle depending on the minimum distance and possibly also on said at least one other datum;
  to determine the position of the point of impact, provision is made to determine the relative longitudinal and lateral speeds of the obstacle with respect to the motor vehicle, to deduce therefrom a time before theoretical impact between the motor vehicle and the obstacle, to determine the position of the obstacle at a later time corresponding to the time before theoretical impact, and to deduce therefrom the theoretical impact position;
  the step of determining the position of the obstacle is implemented only if the time before theoretical impact is less than a predetermined threshold;
  the avoidance path is generated such that its derivatives, and especially its first, second, or even also third derivatives, meet predetermined inequality constraints;
  at least one of the predetermined inequality constraints relates to the passage of the avoidance path outside the theoretical impact position;
  if no avoidance path having derivatives that meet said inequality constraints is found, a step of adjusting the final position of the motor vehicle then a new step of generating the avoidance path are provided;
  the avoidance path is generated by means of a method of convex optimization, especially via a sum-of-squares method or via sampling;
  the motor vehicle being, on its arrival at the initial position, driven on an initial path, provision is made for an operation for determining a second portion of the avoidance path allowing the motor vehicle to return to the initial path, which comprises steps of determining a second final position depending on the position of the obstacle with respect to the motor vehicle and depending on said final position, determining a second theoretical impact position located between the final position and the second final position, depending on at least a minimum distance to be kept between the avoidance path and the obstacle, and determining the second portion of the avoidance path so that the motor vehicle passes through the second final position and avoids the second theoretical impact position to the outside with respect to the obstacle.

The invention also relates to a system for determining an avoidance path of a motor vehicle, comprising:
 a detecting system able to acquire data relating to an obstacle located in the environment of the motor vehicle, and
 a computer able to implement a method such as described above.

Of course, the various features, variants and embodiments of the invention may be associated with one another in various combinations, provided that they are not incompatible with one another or mutually exclusive.

BRIEF DESCRIPTION OF THE DRAWINGS

The description that follows with reference to the appended drawings, which are given by way of non-limiting example, will make it easy to understand what the invention consists of and how it may be implemented. In the appended drawings.

DETAILED DESCRIPTION

Figure 1:
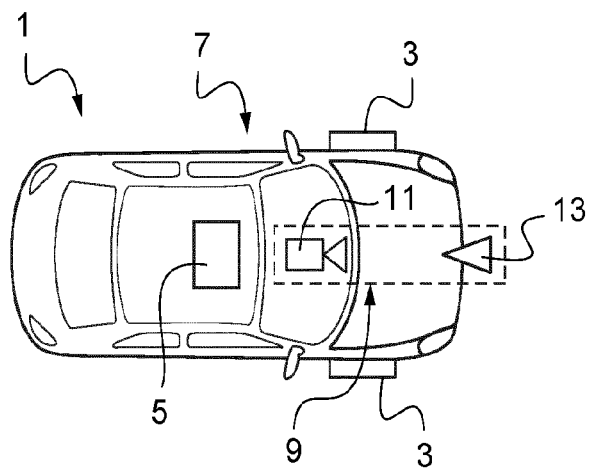
FIG. 1 is a schematic view from above of a motor vehicle.

FIG. 1 shows a motor vehicle 1. The vehicle shown here is an automobile, but it could of course be another type of vehicle, typically a truck.

This motor vehicle 1 comprises two front steered wheels 3.

It further comprises a conventional steering system that makes it possible to act on the orientation of the front wheels 3, so as to be able to turn the vehicle.

The steering system comprises a control member, and more precisely an actuator making it possible to act on the orientation (i.e. the steering angle) of the front wheels depending on the orientation of the steering wheel and/or depending on a request received from a computer 5. This computer 5 is for example a computer dedicated to driver assistance.

In addition, the motor vehicle may comprise a differential-braking system controlled by the same 5 or another computer and making it possible to act differently on the rates of rotation of the front wheels so as to slow the motor vehicle while making it turn.

The computer 5 is programmed to control the power-steering actuator and possibly also the differential-braking actuator. For this purpose, it comprises at least one processor, at least one memory and various input and output interfaces.

By virtue of its input interfaces, the computer 5 is suitable for receiving input signals from a detecting system 9.

This detecting system 9 here comprises various sensors.

Among these sensors, here a front camera 11 is especially provided, allowing the position of the motor vehicle 1 with respect to its traffic lane to be identified.

Provision is further made for a telemetry unit 13 comprising at least one telemetry sensor (RADAR, LIDAR, SONAR) placed at the front of the motor vehicle 1. The telemetry unit 13 may further comprise a plurality of telemetry sensors placed on the sides of the vehicle and allowing the environment on each side of the motor vehicle 1 to be observed.

The detecting system 9 lastly comprises sensors of data relating to the motor vehicle 1, such as a gyrometer allowing the yaw rotation rate (about a vertical axis) of the motor vehicle 1 to be determined, and a sensor of the position and/or angular velocity of the steering wheel.

By virtue of its output interfaces, the computer 5 is suitable for transmitting a setpoint to the power-steering actuator and possibly also the differential-braking actuator.

The computer 5 comprises a memory in which are stored data used in the context of the method described below.

It in particular stores a computer application, consisting of computer programs comprising instructions the execution of which by the processor allows the implementation by the computer of the method described below.

These various components together form a system 7 for determining an obstacle avoidance path.

Figure 2:
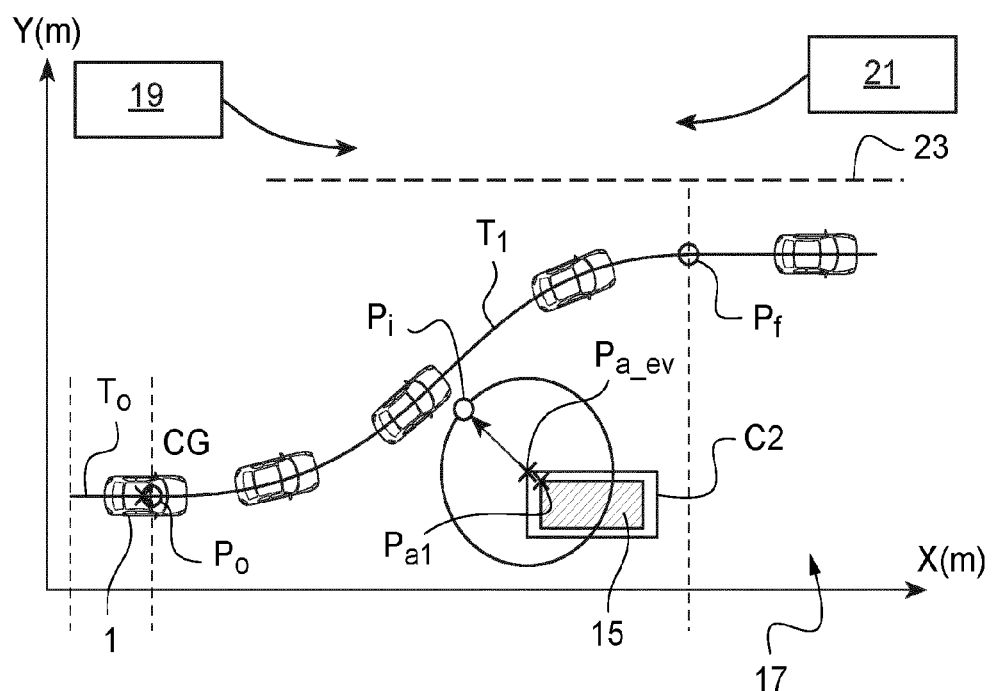
FIG. 2 is a schematic representation of a first portion of an avoidance path for avoiding an obstacle.

FIG. 2 is a schematic view from above of the motor vehicle 1 of FIG. 1, shown in five successive positions located along an avoidance path T1 for avoiding an obstacle 15.

The description of the avoidance path T1 is given with respect to a fixed frame of reference (XY). The X-axis of the frame of reference is preferably parallel to the traffic lane 17 of the motor vehicle 1 when said lane is rectilinear. It is otherwise preferably tangent to this path at the motor vehicle (at the moment when the computer computes the avoidance path).

Here, this X-axis is chosen to lie parallel to a marking line 23 on the ground separating two traffic lanes 21.

As a variant, this X-axis could be chosen to lie parallel to the axis of movement of the motor vehicle 1, i.e. to the longitudinal axis of the vehicle before the initiation of the avoidance maneuver.

The Y-axis is horizontal and perpendicular to the X-axis.

FIG. 2 shows the initial path T0 of the motor vehicle 10, such as was being followed by the motor vehicle 1 before the obstacle was detected and the avoidance maneuver initiated.

In the example shown here, this initial path T0 is linear and parallel to the marking line 23 on the ground.

At this stage, it will be noted that the paths of which it is a question in the present description are those followed by the center of gravity CG of the motor vehicle 1.

In the example considered here, the obstacle 15 is located in the traffic lane 17 of the motor vehicle 1, in front of the latter. The obstacle 15 is for example another vehicle, a bicycle, a pedestrian or indeed a static object. This obstacle 15 may therefore be either moving or stationary.

Other obstacles 19, 21 may be found in the environment of the motor vehicle 1. In the example considered here, these other obstacles are located in an adjacent traffic lane different from that taken by the motor vehicle 1.

According to the invention, the computer 5, when it detects an obstacle 15 located on the path of the motor vehicle 1, implements a method for determining an avoidance path T1.

To do this, in a first step a), the detecting system 9 acquires data relating to the obstacle 15.

Here, this obstacle is characterized, by virtue of the detecting system 9, by its shape, its nature, its position relative to the motor vehicle 1 (and especially its distance d to the motor vehicle) and its longitudinal (along the X-axis) and lateral (along the Y-axis) speeds relative to those of the motor vehicle 1.

The shape of the obstacle is here obtained by fusing data from various sensors. It will thus possibly be defined by a length, a width and a reference point that will then be used in the computations. As will be well described below, this reference point will for example be the corner of the obstacle closest to the avoidance path.

The nature of the obstacle may also be obtained by data fusion. As will be well described below, this nature (pedestrian, truck, automobile, etc.) will then be used to adjust the safety distance that it is desired to keep between the obstacle and the avoidance path (this distance for example being larger for a pedestrian, the behavior of which is generally more difficult to anticipate).

In a second step b), the computer 5 detects a potential risk of collision between the motor vehicle 1 and the obstacle 15, on the basis of the acquired data.

In order to detect this risk, the computer 5 may use data relating to the motor vehicle 1. These data include, for example, the linear speed of the motor vehicle, the yaw rate of the vehicle, the position of the steering wheel and its angular velocity.

If a potential risk of collision is detected, the computer implements a third step c).

In this step c), the computer 5 acquires the initial position P0 of the motor vehicle 1 at the start of the avoidance maneuver. This initial position P0, the coordinates of which are denoted (X0, Y0), more precisely corresponds to the current position at the present moment of the center of gravity CG of the motor vehicle 1 in the frame of reference (X, Y).

In a step d), the computer determines a first final position Pf, the coordinates of which are denoted (Xf, Yf), that the motor vehicle 1 must reach at the end of a first portion of the avoidance path T1. This first portion corresponds to the segment of the avoidance path T1 in which the motor vehicle 1 deviates from its initial path T0. The second portion for its part corresponds to the segment in which the motor vehicle 1 returns to its initial path T0.

In this step d), the computer 5 attributes for example to the abscissa Xf a value that corresponds to the abscissa of the current position of the obstacle 15.

The computer 5 moreover attributes to the ordinate Yf a value which is greater than the highest ordinate of the obstacle 15 and which is less than a limit value Ylim.

This limit value Ylim is determined for example on the basis of data relating to the environment captured by the detecting system 9. It may for example be the ordinate of the marking line 23 on the ground, or even the lowest ordinate of the other obstacles 19, 21 present in the environment of the motor vehicle 1 (a safety margin possibly furthermore being envisioned).

In a step e), the computer 5 determines a theoretical impact position Pi, the coordinates of which are denoted (Xi, Yi). This theoretical impact position Pi corresponds to an extreme position of a safety zone located around the obstacle 15 and through which it is not desirable for the motor vehicle 1 to pass, in order to avoid the obstacle 15 in complete safety. This point of impact Pi is therefore the point located on the periphery of this safety zone, at the smallest distance from a predicted avoidance path. This point of impact is qualified as theoretical in the sense that there would be no impact between the vehicle and the obstacle if the vehicle passed through this point. Specifically, it is computed so as to take into account many parameters such as the longitudinal and lateral speed of the obstacle, the measurement errors of the sensors, etc.

The abscissa of this theoretical impact position Pi is located between the abscissa of the initial position P0 and of the final position Pf. The ordinate of this theoretical impact position Pi is located between the ordinates of the initial position P0 and of the final position Pf.

To compute the coordinates of this point of impact Pi, provision is made for the detecting system 9 to determine the coordinates of points of the outline of the obstacle 15 in the frame of reference (X, Y). The data originates from the front camera and/or the telemetry unit of the motor vehicle 1. Here, the data from these two sensors are fused.

Figure 3:
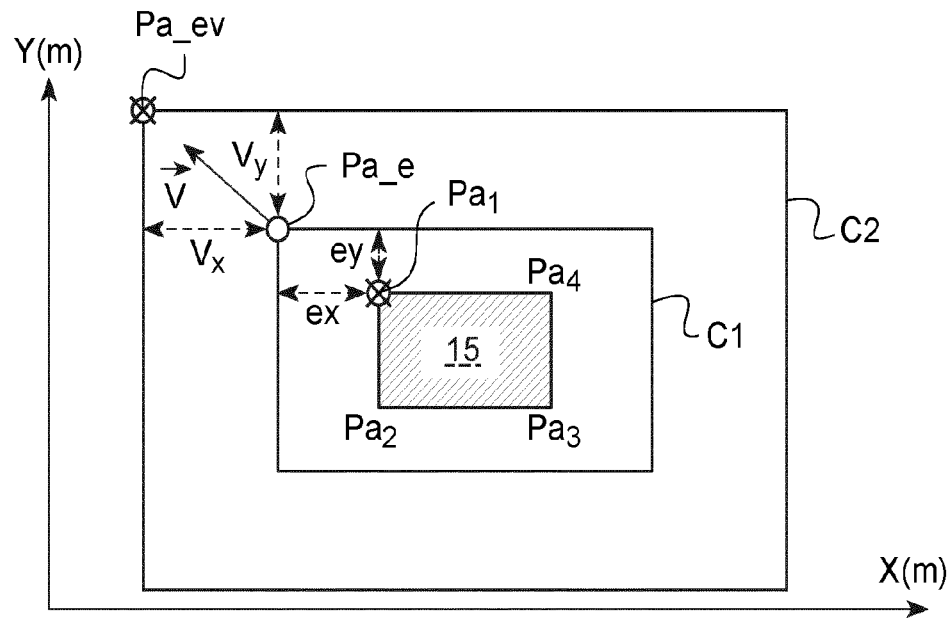
FIG. 3 is a schematic view from above of the obstacle of FIG. 2 and of various safety zones around the obstacle.

Next, as shown in FIG. 3, the detecting system determines the coordinates of tracked points Pa1, Pa2, Pa3, Pa4 of the obstacle 15. The tracked points Pa1, Pa2, Pa3, Pa4 are "notable" points of the obstacle 15 located at the periphery of the latter. These are therefore points that are easily detectable (for example by image processing). For example, in the case of an obstacle 15 formed by an automobile, the tracked points correspond to the four corners of a rectangle modeling this automobile.

The computer 5 then determines which of these tracked points will be closest to the motor vehicle 1 during the avoidance maneuver. It does this based on the predicted avoidance path, which indicates whether the motor vehicle will avoid the obstacle to the left or to the right.

To obtain this predicted avoidance path, the computer 5 determines whether the obstacle 15 should be avoided to the left or to the right on the basis of the environmental data. By way of example, if the gap between the obstacle 15 and the marking 23 on the ground is large enough to allow the motor vehicle 1 to pass between these two elements, then the obstacle may be avoided to the left.

The terms "right" and "left" are to be understood in the usual sense relative to the direction of travel of the vehicle, and are defined with respect to the direction of the X-axis.

In the example illustrated, the obstacle 15 is another vehicle that it is desired to avoid to the left. The tracked point to be avoided is then the rear left corner Pa1 of the obstacle 15.

The tracked point Pa1 to be avoided has coordinates ($X_a$, $Y_a$) in the frame of reference (X, Y).

The computations that follow therefore describe a situation in which the avoidance path allows the vehicle to avoid the obstacle 15 to the left. In other different cases, the presented computations will have to be modified accordingly.

Given any speed of the obstacle 15, the width of the motor vehicle 1, possible detection errors and any other possible parameter, the avoidance path T1 must pass at a distance from this tracked point Pa1.

The point of impact Pi is therefore determined depending on the position of this tracked point Pa1, but is located at a distance from the latter.

To take measurement errors into account, the computer 5 determines the coordinates ($X_{a\_e}$, $Y_{a\_e}$) of a first shifted point Pa_e using the formulas:

$$X_{a\_e} = X_a - |e_x| \quad \text{(1)[Math. 1]}$$

$$Y_{a\_e} = Y_a + |e_y| \quad \text{(2)[Math. 2]}$$

where $e_x$ is a measurement error of the detecting means 9 along the X-axis and $e_y$ is a measurement error of the detecting means 9 along the transverse Y-axis. In the case where data fusion is used, the measurement error also takes into account the error originating from the data fusion. The measurement errors $e_x$, $e_y$ are predetermined and stored in a memory of the computer.

In FIG. 3, the box C1 corresponds to the safety zone around the obstacle 15, through which zone it is advisable not to pass so as not to strike the obstacle 15, taking into account errors that may possibly have affected the measurements carried out by the detecting means 9.

To take into account the possible movement of the obstacle 15, the computer first of all determines a time before collision τ, which corresponds to the time before impact with the obstacle 15 if the motor vehicle does not deviate from its initial path T0.

If the time before collision τ is less than the maximum duration of an automatic avoidance maneuver (which duration depends on the avoidance system and is for example 3 or 4 seconds), the process continues as follows.

To take into account the speed of movement of the obstacle 15, in order to adjust the safety distance between the path of the vehicle and the obstacle, the computer 5 determines the coordinates ($X_{a\_ev}$, $Y_{a\_ve}$) of a second shifted point Pa_ev using the formulas:

$$X_{a\_ev} = X_{a\_e} + \max(0, d_{Vx}) \quad \text{[Math. 3]}$$

$$Y_{a\_ev} = Y_{a\_e} - \max(0, d_{Vy}) \quad \text{[Math. 4]}$$

In these formulas, the movement of the obstacle 15 has coordinates denoted (dVx, dVy), which are obtained on the basis of the longitudinal and lateral coordinates ($V_x$, $V_y$) of the velocity vector of the obstacle 15 and of the time before collision τ, according to the following formulas:

$$d_{Vx} = V_x \tau \quad \text{[Math. 5]}$$

$$d_{Vy} = V_y \tau \quad \text{[Math. 6]}$$

In FIG. 3, the box C2 corresponds to the safety zone around the obstacle 15, through which zone it is advisable not to pass so as not to strike the obstacle 15, given errors that may possibly have affected the measurements carried out by the detecting means 9 and given the speed of the obstacle 15.

Figure 4:
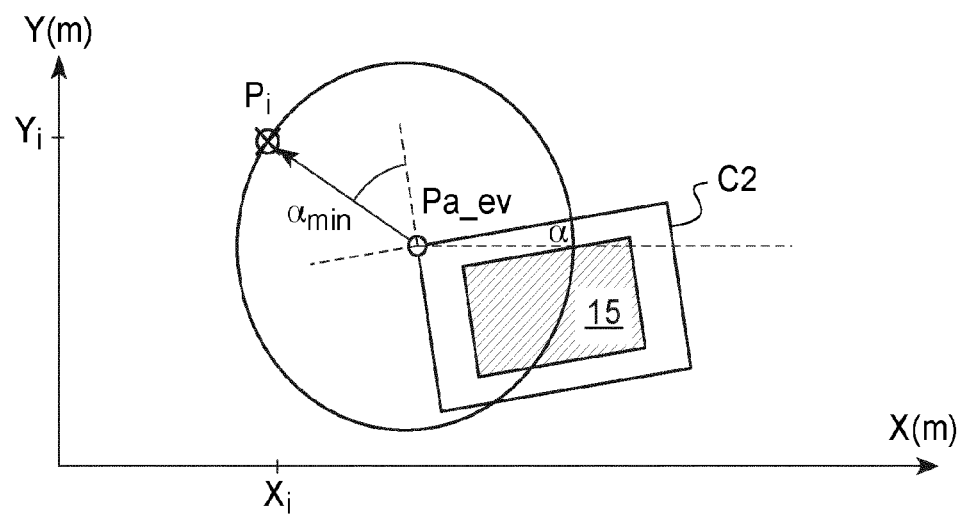
FIG. 4 is another schematic view from above of the obstacle of FIG. 2 and of another safety zone.

As shown in FIG. 4, the computer then determines the coordinates (Xi, Yi) of the point of impact Pi on the basis of the coordinates of the second shifted point Pa_ev and depending on a minimum safety distance dmin to be kept between the avoidance path T1 and the obstacle 15.

This distance first of all takes into account the half-width of the motor vehicle 1. Specifically, it will be recalled that the computed path is the path intended to be followed by the center of gravity of the vehicle. It is therefore necessary to take into account the size of the vehicle.

The minimum safety distance dmin, which corresponds to an avoidance radius, is therefore chosen to be greater than or equal to half of the greatest width of the vehicle.

The minimum safety distance dmin may be chosen to be invariable.

Here it is rather determined depending on the nature (for example: vehicle, bicycle, pedestrian, etc.) of the obstacle 15 to be avoided, which nature is determined in a known manner on the basis of the data acquired by the detecting system 9. It may also depend on other factors such as road slippiness (rain, snow, on ice, etc.).

It is thus possible to make provision to respect a safety interval that is greater for a bicycle than for a pedestrian or than for a fixed obstacle.

This minimum safety distance dmin is oriented with respect to the vehicle and therefore with respect to the obstacle, such that said distance has a longitudinal component along the X-axis and a lateral component along the Y-axis.

Thus, the coordinates (Xi, Yi) of the point of impact Pi are then computed by means of the following equations:

$$X_i = X_{a\_ev} - d_{min} \cdot \sin\left(\alpha + \frac{\pi}{4}\right) \quad \text{[Math. 7]}$$

$$Y_i = Y_{a\_ev} + d_{min} \cdot \cos\left(\alpha + \frac{\pi}{4}\right) \quad \text{[Math. 8]}$$

where α is the angle made between the X-axis and the longitudinal axis of the obstacle 15.

Next, in a step f), the computer 5 generates the avoidance path T1. This path is generated so that the vehicle passes through the initial position P0 and through the final position Pf and so that it avoids the theoretical impact position Pi to the outside with respect to the obstacle (i.e. to the left of the theoretical impact position Pi if the obstacle is avoided to the left, and vice versa).

The avoidance path T1 is here chosen so as to have a polynomial form; this may be written:

$$f(x) = \Sigma_0^N a_i x^i \quad \text{[Math. 9]}$$

where f is the polynomial function of the avoidance path, x the abscissa along the X-axis and N the degree of the polynomial (for example comprised between 4 and 6).

In this step f), the computer 5 seeks to determine the value of the coefficients $a_i$ of the polynomial.

To do this, constraints that the avoidance path T1 must meet to be safe and to pass through the initial and final positions without passing through the theoretical impact position, are set.

The first constraint is that the avoidance path T1 passes through the initial position; this may be written:

$$f(X0) = Y0 \quad \text{[Math. 10]}$$

The second constraint is that the avoidance path T1 passes through the final position Pf; this may be written:

$$f(Xf) = Yf \quad \text{[Math. 11]}$$

The third constraint is that the avoidance path T1 avoids the theoretical impact position Pi to the desired side; this may be written, for avoidance to the left:

$$f(Xi) > Yi \quad \text{[Math. 12]}$$

or, for avoidance to the right $$f(Xi) < Yi \quad \text{[Math. 13]}$$

The fourth constraint is that the first derivative of the avoidance path T1 (this corresponding to the lateral speed of the vehicle) is less than or equal to a first coefficient α, this condition being expressed by the formula:

$$\left|\frac{dy}{dx}\right| \leq \alpha \quad \text{[Math. 14]}$$

The fifth constraint is that the second derivative of the avoidance path T1 (this corresponding to the lateral acceleration of the vehicle) is less than or equal to a second coefficient $\beta$, this condition being expressed by the formula:

$$\left|\frac{d^2y}{d^2x}\right| \leq \beta \qquad \text{[Math. 15]}$$

The sixth constraint is that the third derivative of the avoidance path T1 (this corresponding to "jerks") is less than or equal to a third coefficient $\gamma$, this condition being expressed by the formula:

$$\left|\frac{d^3y}{d^3x}\right| \leq \gamma \qquad \text{[Math. 16]}$$

The two coefficients $\alpha$, $\beta$ relate to the controllability limit of the actuators of the system and of the vehicle. The third coefficient is essentially related to the comfort felt in the vehicle.

These constraints allow, for safety reasons, the ability of the system to actuate the actuators to be limited, especially so that the driver may regain control of the vehicle at any time during the avoidance maneuver.

The values of the three coefficients $\alpha$, $\beta$, $\gamma$ are predetermined, taking into account the dynamic capacities of the vehicle.

The first three aforementioned constraints are linear and easy to solve by means of numerical optimization tools.

The other three inequality constraints are more difficult to meet.

To do so, either of the two solving methods described below may for example be used.

According to a first method, the problem is solved by means of a method of convex optimization, preferably via the sum-of-squares method. The principle of this method is well-known and will not be described in detail. It will only be described how to apply it to the present case.

Beforehand, in order to simplify the expression of the computations, the following two parameters may be introduced:

$$\bar{X} = \frac{X0 + Xf}{2} \qquad \text{[Math. 17]}$$

$$\check{X} = \frac{Xf - X0}{2} \qquad \text{[Math. 18]}$$

The fourth constraint is guaranteed if there are two polynomials $P_{\alpha 1}(x)$ and $P_{\alpha 2}(x)$, for example of order 2, that are such that:

$$\alpha - \Sigma_1^N i\alpha_i x^{i-1} - P_{\alpha 1}(x)[\check{X}^2 - (x-\bar{X})^2] \geq 0 \qquad \text{[Math. 19]}$$

$$P_{\alpha 1} \geq 0 \qquad \text{[Math. 20]}$$

$$\alpha - \Sigma_1^N i\alpha_i x^{i-1} - P_{\alpha 2}(x)[\check{X}^2 - (x-\bar{X})^2] \geq 0 \qquad \text{[Math. 21]}$$

$$P_{\alpha 2} \geq 0 \qquad \text{[Math. 22]}$$

In other words, it is possible to find an avoidance path T1 which meets the fourth constraint if the four aforementioned expressions may be written in the form of sums of squares.

It is then possible to write similar expressions for the fifth and sixth constraints.

Thus, the fifth constraint is guaranteed if there are two polynomials $P_{\beta 1}(x)$ and $P_{\beta 2}(x)$, for example of order 2, that are such that:

$$\beta - \Sigma_2^N i(i-1)\alpha_i x^{i-2} - P_{\beta 1}(x)[\check{X}^2 - (x-\bar{X})^2] \geq 0 \qquad \text{[Math. 23]}$$

$$P_{\beta 1} \geq 0 \qquad \text{[Math. 24]}$$

$$\beta - \Sigma_2^N i(i-1)\alpha_i x^{i-2} - P_{\beta 2}(x)[\check{X}^2 - (x-\bar{X})^2] \geq 0 \qquad \text{[Math. 25]}$$

$$P_{\beta 2} \geq 0 \qquad \text{[Math. 26]}$$

In the same way, the sixth constraint is guaranteed if there are two polynomials $P_{\gamma 1}(x)$ and $P_{\gamma 2}(x)$, for example of order 2, that are such that:

$$\gamma - \Sigma_3^N i(i-1)\alpha_i x^{i-3} - P_{\gamma 1}(x)[\check{X}^2 - (x-\bar{X})^2] \geq 0 \qquad \text{[Math. 27]}$$

$$P_{\gamma 1} \geq 0 \qquad \text{[Math. 28]}$$

$$\gamma - \Sigma_3^N i(i-1)\alpha_i x^{i-3} - P_{\gamma 2}(x)[\check{X}^2 - (x-\bar{X})^2] \geq 0 \qquad \text{[Math. 29]}$$

$$P_{\gamma 2} \geq 0 \qquad \text{[Math. 30]}$$

If the computer determines that there is an avoidance path T1 allowing all of the six constraints to be met, then the avoidance maneuver may be initiated in a final step.

Otherwise, the idea is to adjust the final position Pf until a path that meets the six constraints is found.

To do this, the abscissa Xf may be incremented by a predetermined value $\Delta x$ until the computer finds an avoidance path T1.

It is also possible to adjust the value of the ordinate Yf of the final position, for example by incrementing or decreasing it, while however remaining within the limits detailed above.

As a variant (or in addition if the modification of the final position did not allow an adequate avoidance path T1 to be found), the sixth constraint may be neglected. Specifically, this constraint relates to the comfort of the passenger and not to his safety in the sense that it prevents the motor vehicle from changing direction too abruptly in order to avoid a "jerk" that would be unpleasant for the passenger.

Thus, this first solving method always allows a suitable avoidance path T1 to be found.

It is now possible to detail the second method for solving the constraints problem. This second method is a method of convex optimization via sampling, this method being based on a solution obtained by processing a defined number of problems (linear programming), each problem corresponding to the expression of the constraint at a point of the sampling of the points on the avoidance path T1.

To implement it, a series $S_x$ of M+1 points the abscissas of which are regularly distributed between the abscissas X0 and Xf of the initial and final points is considered. The number M is chosen so as to be strictly greater than two.

The series $S_x$ of points may be written in the form:

$$S_x = \left\{ x_j, x_j = x_0 + j\frac{X_f - X_0}{M} \text{ with } j = 0: M \right\} \qquad \text{[Math. 31]}$$

Next, the six constraints must be met for this series of M+1 points $x_3$.

It will thus be noted that the fourth inequality constraint is met if the first derivative of the polynomial function f satisfies the following equation for all the points of the series $S_x$:

$$\Sigma_1^N i(i-1)\alpha_i x^{i-1} \leq \alpha \qquad \text{[Math. 32]}$$

The fifth inequality constraint is met if the second derivative of the polynomial function f satisfies the following equation for all the points of the series $S_x$:

$$\sum_1^{N} i(i-1)a_i x^{i-2} \leq \beta \quad \text{[Math. 33]}$$

The sixth inequality constraint is met if the third derivative of the polynomial function f satisfies the following equation for all the points of the series $S_x$:

$$\sum_1^{N} i(i-1)a_i x^{i-3} \leq \alpha \quad \text{[Math. 34]}$$

Next, if the computer 5 determines that there is an avoidance path T1 that allows all of these equations to be satisfied, the avoidance maneuver may be initiated for this path.

Otherwise, as explained above, it is possible to move the final point Pf and/or to not consider the sixth constraint, so as to find an adequate avoidance path T1.

There are a higher number of equations to be solved in this method than in the sum-of-squares method. However, all the conditions are linear and are therefore easier to solve. Also, this solving method may easily be implemented in real time by the computer 5 of the motor vehicle 1.

As explained above, the segment of the avoidance path T1 comprised between the initial position P0 and final position Pf is in practice only a first portion of this path.

Unless the driver retakes control of the vehicle, it is preferable to also compute a second portion of the avoidance path T1 which allows the motor vehicle 1 to return to its initial path T0.

The computation of this second portion may begin after the start of the avoidance maneuver, so that this avoidance maneuver may be implemented as quickly as possible.

The computation of the second portion of the avoidance path is substantially identical to the computation of the first portion. Therefore here only how these computation operations differ will be described.

Figure 5:
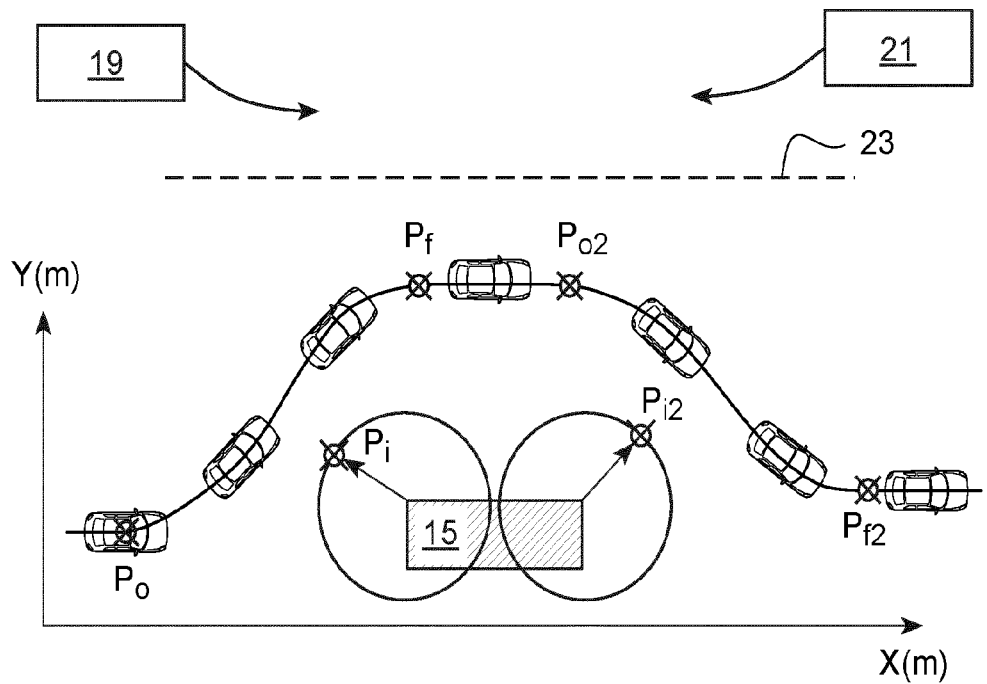
FIG. 5 is a schematic representation of the entire obstacle avoidance path.

In the present case, as shown in FIG. 5, the initial position of the second portion of the avoidance path T1, which is called the second initial position P02 below, is determined as follows.

Provision could be made for the second initial position P02 to coincide with the final position Pf. However, to avoid returning too quickly to the initial path T0 and hitting the obstacle 15, it is preferable to place the second initial position P02 at a distance from the final position Pf.

In this case, the abscissa $X_{02}$ of the second initial position P02 is chosen to be greater than or equal to the length of the obstacle 15. It is further chosen such that the vehicle has time to stabilize by driving in a straight line for a predetermined time.

To favor passenger comfort, the ordinate $Y_{02}$ of the second initial position P02 is chosen to be equal to the ordinate of the final position Pf.

It is thus possible to write:

$$X_{02} = X_f + \max(V^* \tau_{stab}, L_{cible} + 2(d_{Vx} + e_{cap,x})) + \Delta_X \quad \text{[Math. 35]}$$

$$Y_{02} = Y_f \quad \text{[Math. 36]}$$

In these equations, $\tau_{stab}$ is the time required for the vehicle to stabilize, $L_{cible}$ is the length of the obstacle 15, V is the speed of the motor vehicle 1, and $\Delta x$ is a predetermined safety margin. The parameters $\tau_{stab}$ and $\Delta x$ may be set depending on the speed of the motor vehicle.

The choice of the abscissa of the second final position Pf2 (that located at the end of the avoidance path T1) is fairly free. It may be set depending on the desired dynamics (sporty driving style or smooth driving style).

The choice of the second theoretical impact position Pi2 is for its part made in the same way as for the point of impact Pi, except that the minimum safety distance dmin may possibly be chosen to be greater.

The other computations are for their part carried out in a manner homologous to that described above.

In the same manner, a plurality of obstacles may be simultaneously taken into account, this generating multiple theoretical points of impact, for example for fixed obstacles (such as a road edge, a road barrier, a post, etc.) or mobile obstacles (vehicles in adjacent lanes, whether moving in the same direction or on-coming). These obstacles will possibly be taken into account with or without path prediction. As regards mobile obstacles, their paths (for a given duration) will possibly be estimated for example in order to adjust the limit value Ylim accordingly.

The invention claimed is:

1. A method for determining an avoidance path of a motor vehicle, comprising steps of:
    acquiring data relating to at least one obstacle located in an environment of the motor vehicle by a detecting system, the data comprising a distance between the motor vehicle and the obstacle;
    determining a final position to be reached by the motor vehicle depending on a position of the obstacle and on an initial position of the motor vehicle;
    determining a theoretical impact position located between the initial position and the final position, depending on at least a minimum distance to be kept between the avoidance path and the obstacle, comprising:
        determining a position of a first point of the obstacle closest to a predicted avoidance path on a basis of the data acquired by the detecting system; and
        deducing the theoretical impact position depending on the position of the first point, the minimum distance, and at least one other datum;
    generating the avoidance path so that the motor vehicle passes through the initial position and through the final position and so that the motor vehicle avoids the theoretical impact position to an outside with respect to the obstacle; and
    controlling at least one system of the motor vehicle based on the generated avoidance path.

2. The method as claimed in claim 1, wherein the minimum distance is oriented with respect to the motor vehicle, so as to have at least a longitudinal component with respect to a longitudinal axis of the motor vehicle.

3. The method as claimed in claim 1, wherein the at least one other datum belongs to the following list:
    a predetermined uncertainty of the detecting system;
    a nature of the obstacle; and
    a relative speed of the obstacle with respect to the motor vehicle.

4. The method as claimed in claim 3, wherein provision is made to determine a safety zone around the obstacle depending on the minimum distance.

5. The method as claimed in claim 3, wherein, to determine the theoretical impact position, provision is made to:
    determine relative longitudinal and lateral speeds of the obstacle with respect to the motor vehicle;
    deduce therefrom a time before theoretical impact between the motor vehicle and the obstacle;
    determine the position of the obstacle at a later time corresponding to the time before theoretical impact; and
    deduce therefrom the theoretical impact position.

6. The method as claimed in claim 5, wherein the step of determining the position of the obstacle is implemented only if the time before theoretical impact is less than a predetermined threshold.

7. The method as claimed in claim 1, wherein the avoidance path is generated such that its derivatives, and especially its first, second, and third derivatives, meet predetermined inequality constraints.

8. The method as claimed in claim 1, wherein the avoidance path is generated so as to meet a constraint that relates to a passage of the avoidance path outside the theoretical impact position.

9. The method as claimed in claim 7, wherein, if no avoidance path the derivatives of which meet the predetermined inequality constraints is found, a step of adjusting the final position of the motor vehicle then a new step of generating the avoidance path is provided.

10. The method as claimed in claim 7, wherein the avoidance path is generated by a method of convex optimization, especially via a sum-of-squares method or via sampling.

11. The method as claimed in claim 1, wherein the motor vehicle being, on its arrival at the initial position, driven on an initial path, provision is made for an operation for determining a second portion of the avoidance path allowing the motor vehicle to return to the initial path, which comprises steps of:
  determining a second final position depending on the position of the obstacle with respect to the motor vehicle and depending on the final position;
  determining a second theoretical impact position located between the final position and the second final position, depending on at least the minimum distance to be kept between the avoidance path and the obstacle; and
  determining the second portion of the avoidance path so that the motor vehicle passes through the second final position and avoids the second theoretical impact position to the outside with respect to the obstacle.

12. A system for determining an avoidance path of a motor vehicle, comprising:
  a detecting system able to acquire data relating to an obstacle located in the environment of the motor vehicle; and
  a computer able to implement a method as claimed in claim 1.

* * * * *